United States Patent Office 3,495,006
Patented Feb. 10, 1970

3,495,006
METHOD FOR TREATING AMEBIASIS
Gerhard R. Wendt, Havertown, and Kurt W. Ledig, Philadelphia, Pa., assignors to American Home Products Corporation, New York, N.Y., a corporation of Delaware
No Drawing. Filed Jan. 31, 1967, Ser. No. 612,793
Int. Cl. A61k 27/00
U.S. Cl. 424—250
5 Claims

ABSTRACT OF THE DISCLOSURE

Diseases, especially amebic dysentery, caused by *Entameba histolytica* in warm-blooded animals are alleviated by treating the patients with 2,3-dihydroxy-1,4-phenazinediones or 1,2,3,4-phenazinetetrones and compositions thereof.

This invention relates to the treatment of amebiasis. More particularly it is concerned with alleviating the harmful effects of pathogenic ameba on higher animals.

Amebiasis is an infectious disease caused by *Entameba histolytica*, producing a colitis characterized by the painful passage of bloody mucoid stools, but often causing only mild symptoms. The term "amebiasis" includes broadly, in addition to amebic colitis, amebic dysentery and hepatic amebiasis. This disease is more widespread than generally is though. Surveys indicate that the range of the infection rate in the United States is approximately 1 to 10%, although in some southern localities the incidence has reached 40%. The Merck Manual, 11th edition, p. 826. Historically, the disease has been kept under control by public enforcement of, and private attention to, sanitation measures such as control of insects, washing of foods and medical examination of food handlers. However, once infected with the amebic parasite a patient develops symptoms ranging from mild discomfort, such as ill-defined gastrointestinal complaints, diarrhea, constitpation, fatigue, slight fever, vague somatic aches and pains, and the like, to serious complications such as absesses of the bowel with passage of blood, absesses in the liver with jaundice and pain and fever, sweats, chills, nausea, vomiting, weakness and weight-loss. In some instances the infection will involve even the lungs, brain and other organs.

A variety of agents have been used for the treatment of amebiasis. These agents include emetine, a dangerously toxic drug, and antibiotics, such as tetracycline and paramomycin, as well as a number of synthetic materials, such as chloroquine diiodohydroxyquin or arsenic compounds such as arsthinol and carbarsone. Many of these have fallen into disrepute due to their toxicity, low activity and adverse effect on the normal intestinal bacterial flora. An addition to the collection of agents useful against *E. histolytica*, would indeed be welcome. Thus, a definite need exists for means employing effective, inexpensive, well-tolerated antiamebic agents.

It is, accordingly, a primary object of this invention to provide means to treat amebiasis which are particularly effective, non-toxic and characterized by high levels of activity for extended periods of time. A further object is to provide novel amebicidal dosage forms which are particularly effective, non-toxic and characterized by high levels of activity for extended periods of time. Other objects will become apparent from the ensuing description of the invention.

These objects are realized by a means which is, in essence: a method for the treatment of a warm-blooded animal suffering from amebiasis which comprises administering to said warm-blooded animal a compound of Formula I:

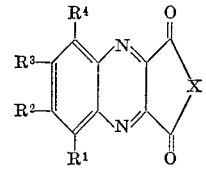

wherein:

$R^1$ and $R^4$ are hydrogen, alkyl of from about 1 to about 6 carbon atoms, alkoxy of from about 1 to about 6 carbon atoms or halogen;

$R^2$ and $R^3$ are hydrogen, alkyl of from about 1 to about 6 carbon atoms, alkoxy of from about 1 to about 6 carbon atoms, amino, halogen, hydroxymethyl or nitro;

$R^2$ and $R^3$, taken together, are

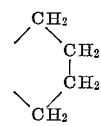

or

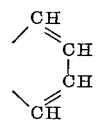

$R^3$ and $R^4$, taken together, are

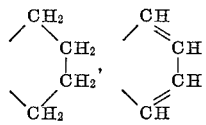

or

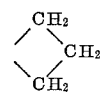

and X is

or

the quantity of said compound administered being sufficient to alleviate the amebiasis. Also contemplated is an embodiment of such a method comprising administering said compound in admixture with a pharmaceutical, preferably orally administrable, carrier. Especially effective to treat amebiasis are the species of Formula I which are 2,3-dihydroxy-7,8-dimethyl-1,4-phenazinedione, a compound of Formula I wherein $R^1$ and $R^4$ are hydrogen, $R^2$ and $R^3$ are methyl and X is —C(OH)=C(OH)—; 9,10-dihydroxybenzo[a]phenazine-8,11-dione, a compound of Formula I wherein $R^1$ and $R^2$ are hydrogen, $R^3$ and $R^4$, together, are —CH=CH—CH=CH—, and X is

—C(OH)=C(OH)— and 2,3-dihydroxy-1,4-benzo[b]phenazinedione, a compound of Formula I wherein $R^1$ and $R^4$ are hydrogen, $R^2$ and $R^3$, together, are —CH=CH—CH=CH— and X is —C(OH)=C(OH)—.

The compounds of Formula I are made by a process comprising treating a diamine compound of Formula II:

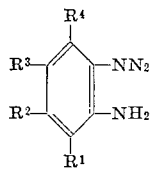

wherein $R^1$, $R^2$, $R^3$ and $R^4$ are as herein-above defined, with a compound of Formula III:

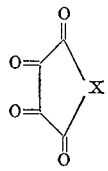

wherein X is as hereinabove defined until formation of the 2,3-dihydroxy-1,4-phenazinedione ring is substantially complete and, if required, treating said 2,3-dihydroxy-1,4-phenazinedione with an oxidizing agent, such as ferric chloride, dilute nitric acid or obvious chemical equivalents thereof, until formation of a 1,2,3,4-phenazinetetrone ring is substantially complete and recovering the compound of Formula I.

Procedures for the preparation of illustrative compounds of Formula I will be fully described hereinafter.

Use of these compounds and compositions in the treatment of amebiasis in animals according to the present invention involves contact of the infecting parasite with the drug. Dosage is preferably by the oral route if the major site of the infection is the intestinal tract. It is also possible to administer these drugs rectally, or by injection, either subcutaneously or intramuscularly, but these methods are not so convenient as oral medication. The daily dose required varies with the particular composition employed and the animal or human being treated.

For the treatment of domestic animals, a daily dose of one of the new compositions containing an amount of the compound of Formula I of from about 2 to about 50 mg./kg. of body weight is generally sufficient to cause alleviation of the symptoms of amebiasis. Doses of this order can be repeated on consecutive days until the animal is cleared of the parasite.

In humans, as with animals, the dosage varies with the size of the patient. With adults and large children (over 60 lbs.) 100 to 5000 mg. doses per day can be used preferably broken into 50 to 500 mg. per dosage unit. A preferred dosage range for humans is from about 2 to about 40 mg./kg. per day. For dosages, the compounds of Formula I can be compounded into any of the usual oral dosage forms including capsules, tablets, and liquid preparations such as elixirs and suspensions containing various coloring, flavoring, and taste masking substances. Administration of the composition to animals can best be effected by mixing the drug with the feed. The compounds of Formula I can be blended into the animal's daily ration in substantially pure form or diluted with inert carriers such as starch, lactose and the like. For compounding oral dosage forms the active ingredient can be diluted with various tableting materials such as starches of various types, calcium carbonate, lactose, sucrose, and dicalcium phosphate to simplify the tableting and capsulating process. A minor proportion (1–2%) of magnesium stearate is useful as a lubricant. With capsules of various types, the proportion of carrier is of less importance, and the carrier can even be eliminated.

The following procedures are useful to prepare illustrative members of the drugs of Formula I. Other compounds within the scope of Formula I can easily be prepared by those skilled in the art using entirely analogous reagents and process conditions.

PROCEDURE A 2,3-dihydroxy-7,8-dimethyl-1,4-phenazinedione

A solution of 2.1 g. of 4,5-dimethyl-o-phenylenediamine in 50 ml. of 2 N sulfuric acid is added to a solution of rhodizonic acid dipotassium salt in 50 ml. 2 N sulfuric acid. After standing for 48 hours at room temperature, the material is collected and recrystallized from aqueous tetrahydrofuran to obtain the title compound; M.P. 300°.

*Analysis.*—Found: C, 62.13; H, 3.90; N, 10.66. $C_{14}H_{10}N_2O_4$ requires: C, 62.22; H, 3.73; N, 10.37.

PROCEDURE B 7-chloro-2,3-dihydroxy-1,4-phenazinedione

A solution of 2.5 g. 4-chloro-o-phenylenediamine in 50 ml. of 2 N sulfuric acid is added to a solution of 3.7 g. of rhodizonic acid dipotassium salt in 50 ml. of 2 N sulfuric acid. The resulting precipitate is filtered and dissolved in 200 ml. of tetrahydrofuran. On the addition of 200 ml. of water, 2.5 g. of the title compound is obtained; M.P. 250° dec.

*Analysis.*—Found: C, 52.36; H, 2.00; N, 10.40; Cl, 13.20. $C_{12}H_5N_2O_4Cl$ requires: C, 52.10; H, 1.82; N, 10.12; Cl, 12.82.

PROCEDURE C 7,8-dichloro-2,3-dihydroxy-1,4-phenazinedione

A hot solution of 3.0 g. of 4,5-dichloro-o-phenylenediamine in 100 ml. of 2 N sulfuric acid is cooled to approximately 30° C. and the resulting thick paste is mixed with a solution of 4.2 g. of rhodizonic acid dipotassium salt in 50 ml. of 2 N sulfuric acid. The reaction mixture is stirred for 2 hours at room temperature and then filtered off. Recrystallization from tetrahydrofuran affords 1.5 g. of the title compound, as the hemihydrate; M.P. >300°.

*Analysis.*—Found: C, 45.10; H, 1.89; N, 9.11; Cl, 22.2. $C_{12}H_4N_2O_2Cl_2 \cdot \frac{1}{2} H_2O$ requires: C, 45.03; H, 1.57; N, 8.76; Cl, 22.15.

PROCEDURE D 2,3-dihydroxy-1,4-phenazinedione

This compound is prepared according to the procedure described by R. Nietzki and A. W. Schmidt, Ber., 21, 1227 (1888).

PROCEDURE E 1,2,3,4-phenazinetetrone

This compound is prepared by oxidation of the compound of Procedure D, according to the technique described by R. Nietzke and A. W. Schmidt, Ber., 21, 1228 (1888).

PROCEDURE F 2,3-dihydroxy-7,8-dimethoxy-1,4-phenazinedione, hemihydrate

A solution of 2.3 g. of 4,5-dinitroveratrol, 200 ml. of ethanol, 25 ml. of tetrahydrofuran, and 1.0 g. of Pd/C 5% is hydrogenated at 1 atmosphere pressure. After the theoretical amount of hydrogen has been taken up, the reaction mixture is filtered and acidified with 25 ml. of 2 N sulfuric acid. The resulting suspension of 4,5-dimethoxy-o-phenylenediamine is added while stirring to a solution of 2.5 g. of rhodizonic acid dipotassium salt in 25 ml. of 2 N sulfuric acid. The suspension is stirred for 1½ hours and after 48 hours, the precipitate is filtered and recrystallized from acetic acid to obtain the product; M.P. 270° dec.

*Analysis.*—Found: C, 54.35; H, 3.53; N, 9.41. $C_{14}H_{10}N_2O_6 \cdot \frac{1}{2} H_2O$ requires: C, 54.02; H, 3.56; N, 9.00.

PROCEDURE G

2,3-dihydroxy-6,7,8-trimethyl-1,4-phenazine-dione

A hot solution of 2.4 g. of 1,2-diamino-4,5,6-trimethylbenzene dihydrochloride in 50 ml. 2 N sulfuric acid and 25 ml. ethanol is added to a stirring solution of 2.46 g. of rhodizonic acid dipotassium salt. The reaction mixture is stirred for 3 hours. After standing overnight at room temperature, the resulting precipitate is filtered. Recrystallization from tetrahydrofuran-water, 1:1, affords 280 mg. of product; M.P. 280°.

*Analysis.*—Found: C, 63.46; H, 4.65; N, 10.19. $C_{15}H_{12}N_2O_4$ requires: C, 63.38; H, 4.26; N, 9.86.

PROCEDURE H

2,3-dihydroxy-6,8-dimethyl-1,4-phenazinedione

A solution of 2.7 g. of 3,5-dimethyl-o-phenylenediamine in 100 ml. of 10% sulfuric acid in 100 ml. of alcohol is added to a solution of 5.0 g. of rhodizonic acid dipotassium salt in 50 ml. of 10% surfuric acid. The reaction mixture is stirred for 2 hours and the precipitate filtered. Recrystallization from tetrahydrofuran-water affords 3.0 g. of the title compound; M.P. 290° dec.

*Analysis.*—Found: C, 62.41; H, 3.23; N, 9.98. $C_{14}H_8N_2O_4$ requires: C, 62.22; H, 3.73; N, 10.37%.

PROCEDURE I

2,3-dihydroxy-6-methyl-1,4-phenazinedione

A solution of 2.4 g. of 3-methyl-o-phenylenediamine in 50 ml. of 2 N sulfuric acid is added to a solution of 5.0 g. of rhodizonic acid dipotassium salt in 50 ml. of 2 N sulfuric acid. The reaction mixture is stirred for 1 hour and the resulting precipitate filtered to give after recrystallization from tetrahydrofuran, 2.6 g. of the product; M.P. >300°.

*Analysis.*—Found: C, 61.11; H, 3.61; N, 11.15. $C_{13}H_8N_2O_4$ requires: C, 60.94; H, 3.15; N, 10.93%.

PROCEDURE J

9,10-dihydroxybenzo[a]phenazine-8,11-dione

A warm suspension of 3.2 g. of 1,2-diaminonaphthalene, 50 ml. of 2 N sulfuric acid, and 150 ml. of alcohol is added to a solution of 5.0 g. of rhodizonic acid dipotassium salt in 50 ml. of 2 N sulfuric acid. The reaction mixture is stirred at 80° for 2 hours and the clear solution left at room temperature overnight to give, after filtration, 6.4 g. of crude material. Recrystallization from tetrahydrofuran yields the product; M.P. >300°.

*Analysis.*—Found: C, 65.95; H, 2.99; N, 9.59. $C_{16}H_8N_2O_4$ requires: C, 65.75; H, 2.76; N, 9.59.

PROCEDURE K

2,3-dihydroxy-1,4-benzo[b]phenazine dione

A hot suspension of 3.2 g. of 2,3-diaminonaphthalene 50 ml. of 2 N sulfuric acid, and 150 ml. of ethanol is added to a solution of 5.0 g. of rhodizonic acid in 50 ml. of 2 N sulfuric acid. The mixture is stirred at 70° for 2 hours and after standing overnight at room temperature. the precipitate is filtered. Reprecipitation from N,N-dimethylformamide and water affords 1.7 g. of the product; M.P. >300°.

*Analysis.*—Found: C, 66.11; H, 3.10; N, 9.37. $C_{16}H_8N_2O_4$ requires: C, 65.75; H, 2.76; N, 9.59.

PROCEDURE L

2,3-dihydroxy-7-methyl-1,4-phenazine dione

A solution of 2.4 g. of 3,4-diaminotoluene in 50 ml. of 2 N sulfuric acid is added to a solution of 5.0 g. of rhodizonic acid dipotassium salt in 50 ml. of 2 N sulfuric acid while stirring. The precipitate is filtered and crystallized from tetrahydrofuran then recrystallized from diethyleneglycol dimethyl ether to yield the title compound; M.P. >300°.

*Analysis.*—Found: C, 61.04; H, 3.22. $C_{13}H_8N_2O_4$ requires: C, 60.94; H, 3.15.

PROCEDURE M

7-amino-2,3-dihydroxy-1,4-phenazinedione

A solution of 4.0 g. of 1,2,4-benzenetriamine dihydrochloride in 50 ml. of 10% sulfuric acid is added to a solution of 5.0 g. of rhodizonic acid dipotassium salt in 50 ml. of 10% sulfuric acid. The precipitate is filtered after standing at room temperature overnight. Recrystallization from water yields the title compound; M.P. >300°.

*Analysis.*—Found: C, 55.17; H, 2.60; N, 16.12. $C_{12}H_7N_3O_4 \cdot \frac{1}{4}H_2O$ requires: C, 55.07; H, 2.89; N, 16.05%.

PROCEDURE N

1,2,3,4-tetrahydro-9,10-dihydroxybenzo[a]-phenazine-8,11-dione

A warm solution of 1.17 g. of 5,6,7,8-tetrahydronaphthalene-1,2-diamine dihydrochloride in 50 ml. 2 N sulfuric acid and ethanol, 1:1, is added to a solution of 1.23 g. of rhodizonic acid dipotassium salt in 25 ml. 2 N sulfuric acid with stirring. After 8 hours, 800 mg. of dark red crystals are obtaned. Recrystallization from tetrahydrofuran-water, 1:1, affords 460 mg. of the pure title compound. The orange crystals melt at 275° (dec.).

*Analysis.*—Found: C, 64.98; H, 3.83; N, 9.10. $C_{16}H_{12}N_2O_4$ requires: C, 64.86; H, 4.08; N, 9.46.

In a similar fashion, employing appropriately-substituted reagents and using the procedures described hereinbefore, the following amebicidal compounds are obtained:

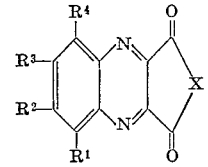

| $R^1$ | $R^2$ | $R^3$ | $R^4$ | X |
|---|---|---|---|---|
| $CH_3$ | H | H | $CH_3$ | —C(OH)=C(OH)— |
| Cl | H | H | Cl | —C(OH)=C(OH)— |
| I | H | I | H | —C(OH)=C(OH)— |
| H | Br | Br | H | —C(OH)=C(OH)— |
| H | F | H | H | —C(OH)=C(OH)— |
| H | Cl | H | H | —C(O)—C(O)— |
| H | $CH_3$ | $CH_3$ | H | —C(O)—C(O)— |
| $OCH_3$ | H | H | $OCH_3$ | —C(OH)=C(OH)— |
| H | —$CH_2OH_2CH_2CH_2$— | | H | —C(OH)=C(OH)— |
| H | $CH_2OH$ | H | H | —C(OH)=C(OH)— |
| H | $NO_2$ | H | H | —C(OH)=C(OH)— |
| H | H | —$CH_2CH_2CH_2$— | | —C(OH)=C(OH)— |

The following examples are given simply to illustrate this invention, but not in any way to limit its scope.

EXAMPLE I

The following materials are thoroughly blended and then compressed into tablets containing 70 mg. of 2,3-dihydroxy-7,8-dimethyl-1,4-phenazinedione per tablet.

|  | Grams |
|---|---|
| 2,3-dihydroxy-7,8-dimethyl-1,4-phenazinedione | 7 |
| Lactose | 24.7 |
| Magnesium stearate | 0.3 |

Two to four of these tablets are administered per day to a 70 kg. animal suffering from amebiasis.

EXAMPLE II

Similarly to Example I, tablets containing 70 mg., respectively, of 9,10 - dihydroxybenzo[a]phenazine - 8,11-dione and 2,3-dihydroxy-1,4-benzo[b]phenazinedione are prepared. These are useful to treat animals suffering from amebiasis.

EXAMPLE III

Tablets containing 70 mg. of the active ingredients prepared in Procedures B–I and L–N and the carriers of Example I are formulated. These are useful to treat animals suffering from amebiasis.

What is claimed is:

1. A method for the treatment of a warm-blooded animal suffering from amebiasis which comprises administering to said warm-blooded animal a compound of the formula:

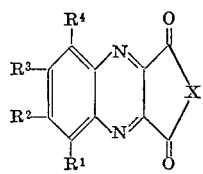

wherein:

$R^1$ and $R^4$ are hydrogen, alkyl of from about 1 to about 6 carbon atoms, alkoxy of from about 1 to about 6 carbon atoms, chlorine or iodine;

$R^2$ and $R^3$ are hydrogen, alkyl of from about 1 to about 6 carbon atoms, alkoxy of from about 1 to about 6 carbon atoms, amino, halogen, hydroxymethyl or nitro;

$R^2$ and $R^3$, taken together, are

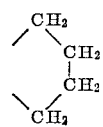

or

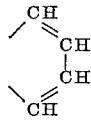

$R^3$ and $R^4$, taken together, are

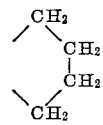

or

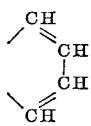

and X is

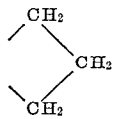

or

the quantity of said compound administered being sufficient to alleviate the amebiasis.

2. A method as defined in claim 1 wherein said compound is administered in admixture with an inert pharmaceutical carrier.

3. A method as defined in claim 1 wherein said compound is 2,3-dihydroxy-7,8-dimethyl-1,4-phenazinedione.

4. A method as defined in claim 1 wherein said compound is 9,10-dihydroxybenzo[a]phenazine-8,11-dione.

5. A method as defined in claim 1 wherein said compound is 2,3-dihydroxy-1,4-benzo[b]phenazinedione.

References Cited

UNITED STATES PATENTS

| | | | |
|---|---|---|---|
| 3,299,064 | 1/1967 | Wendt et al. | 424—250 |
| 3,366,628 | 1/1968 | Wendt et al. | 424—250 |

FOREIGN PATENTS 784,670 10/1957 Great Britain.

OTHER REFERENCES

Nietzki, R. et al. Berichte vol. 21 p. 1227–1230 (1888).

ALBERT T. MEYERS, Primary Examiner

V. D. TURNER, Assistant Examiner